A. A. RUTTAN.
METHOD OF AND APPARATUS FOR MARKING PHOTOGRAPHIC MATERIAL.
APPLICATION FILED MAR. 6, 1916.
1,236,007.
Patented Aug. 7, 1917.
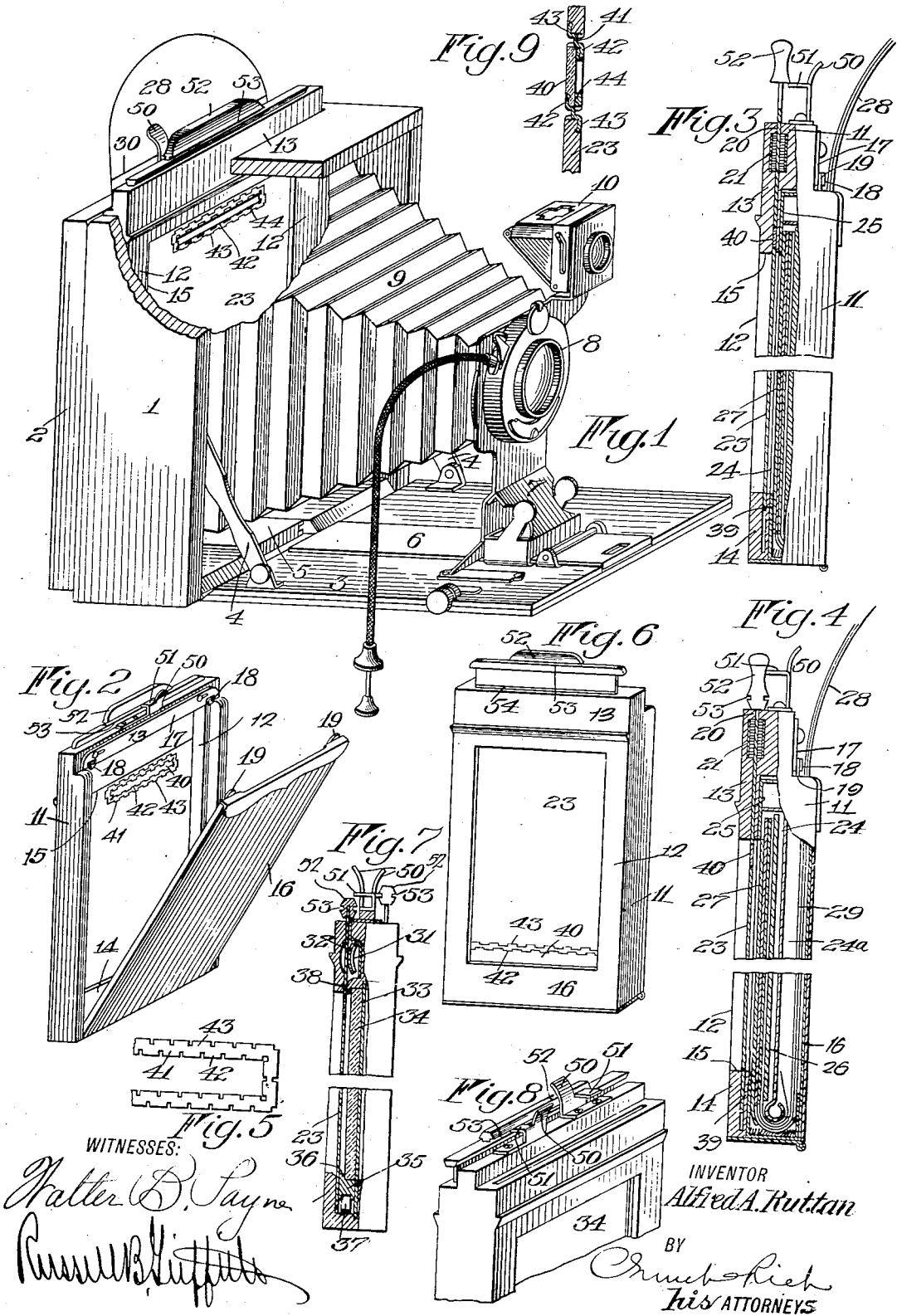
WITNESSES:
INVENTOR
Alfred A. Ruttan
BY
his ATTORNEYS

UNITED STATES PATENT OFFICE.

ALFRED A. RUTTAN, OF ROCHESTER, NEW YORK, ASSIGNOR TO EASTMAN KODAK COMPANY, OF ROCHESTER, NEW YORK, A CORPORATION OF NEW YORK.

METHOD OF AND APPARATUS FOR MARKING PHOTOGRAPHIC MATERIAL.

1,236,007.      Specification of Letters Patent.     Patented Aug. 7, 1917.

Application filed March 6, 1916. Serial No. 82,333.

*To all whom it may concern:*

Be it known that I, ALFRED A. RUTTAN, of Rochester, in the county of Monroe and State of New York, have invented certain new and useful Improvements in Methods of and Apparatus for Marking Photographic Material; and I do hereby declare the following to be a full, clear, and exact description of the same, reference being had to the accompanying drawings, forming a part of this specification, and to the reference-numerals marked thereon.

My present invention relates to photography and more particularly to photographic cameras and those holders for sensitized material used therewith which furnish the operator with means for light printing or photographing designations upon the negatives he makes before they are withdrawn from the apparatus. The invention has for its object to provide a simple method and device of this nature through the use of which the said designations may be conveniently and safely applied photographically (preferably adjacent to the picture at the margin of the exposure opening of the camera or holder) by localized exposure with light preferably admitted through the camera lens. To these and other ends the invention resides in certain improvements and combinations of parts all as will be hereinafter more fully described, the novel features being pointed out in the claims at the end of the specification.

In the drawings:

Figure 1 represents a perspective view of a well known form of camera, having an upper corner cut away to show a film pack adapter, constructed in accordance with and illustrating one embodiment of my invention, arranged therein, the dark slide of the adapter being in place for printing a designation on the contained film;

Fig. 2 is a perspective rear view of the form of adapter shown in Fig. 1, with the hinged back partly open;

Fig. 3 is a sectional view of the same adapter containing a film pack and showing one form of locking means for holding the translucent marking portion of the slide out of operative position;

Fig. 4 is a vertical elevation partly in section of a portion of the adapter with the slide in operative or recording position;

Fig. 5 is an enlarged plan view of a metal blank employed to hold the translucent strip in the slide as illustrated in Fig. 2;

Fig. 6 is a front view in perspective of a modified adapter, in which the slide has its translucent portion at the lower part thereof;

Fig. 7 is a side elevation of an embodiment of my invention as applied to a plate holder, the same being partly broken away to show the interior construction;

Fig. 8 is a perspective view of the top portion of the plate holder shown in Fig. 7, and Fig. 9 is a detail enlarged section through the panel 40 and its fastening devices.

Similar reference numerals throughout the several figures indicate the same parts.

In carrying out my invention, I may employ the dark slide or shutter that normally protects the plate or film in its container as the light printing medium, it being withdrawable to the exterior of the camera for the application of the markings.

My invention is particularly applicable to film packs and their adapters and also to plate holders and in the embodiment illustrated herein contemplates the use of a light excluding container for sensitized material of this or a similar nature, provided with a removable non-actinic dark slide having an actinically translucent portion capable of bearing designations thereon to be light projected on the contained sensitized material, and involving such a construction that the translucent portion may be maintained either in front of the title portion of the sensitized material for the purpose of light printing the designations it carries upon the latter, or behind a light excluding wall of the container so that the picture portion of the sensitized element may be fully protected from the action of actinic light. Referring to Fig. 1, I have shown a well known type of camera adapted for film packs or plate holders, but containing my special form of film pack adapter, and comprising in general the box frame 1; the spring pressed movable back 2 for positioning the adapter; the hinged swing front and bed 3 supported when in an open position by arms 4 connected with the frame 1; the stationary and movable tracks 5 and 6 on the box frame 1 and bed 3, respectively, the carriage 7 slidable thereon; the shutter and lens casing 8; the bellows 9, and the collapsible view finder 10.

The film pack adapter may be of the usual general construction comprising in the present instance, a frame 11 accessible at the rear and top for the introduction of a film pack, and the face member 12 having a top cross piece 13 and a bottom cross piece 14 defining an exposure opening 15 at the front thereof of equal size with that of the normally exposed portion of the contained pack. A cover or door 16 of metal is hinged to the rear of the frame, as usual, and maintained in a closed position by suitable locking means comprising, in the present instance, a bar 17 having projecting L-shaped lugs 18 adapted to be placed in engagement with lugs 19 on the cover 16 by a sliding movement thereof. To light seal a contained film pack at the front, the adapter is provided with a slot 20 having a light lock comprising strips 21 of plush, for example, in a recess in the slot between the upper cross piece 13 and the frame 11 whereby a dark slide, shutter or film cover 23 of suitable non-actinic material may be inserted therethrough to slide in suitable slideways in the frame 11 between the face member 12 and the film pack and cover the exposure opening in the usual manner or serve, as will hereinafter appear, for the application of designating marks on the contained sensitized elements.

In order that the relation of the film pack, when used, and the slide 23 may be readily understood, I have illustrated in Fig. 4 in position in the adapter, a portion of a well known form of film pack containing three films and comprising in general the pack casing 25 open at the front to register with the exposure opening 15 of the adapter, and having an expanding pad 26 therein forming two compartments 24 and 24ᵃ for exposed and unexposed films, and serving to maintain the latter in the exposing compartment 24 in the true focal plane for exposure. According to the well known arrangement, the films 27 when exposed, are shifted from the position shown in the exposure chamber 24, to the storage chamber 24ᵃ in rear of the pad 26 by means of the paper tab strips 28 connected thereto and extending beneath the pad through the exposed film compartment and then through a light locked opening in the upper part of the pack, the strips 29 being finally torn off against the top of the cover 16 after the films have arrived in the storage chamber 24ᵃ.

The upper margin of the film ordinarily concealed behind the face of the pack adjacent to the margin of the exposure opening 15 may be utilized for the application of designations to the film, as explained below, by drawing the film down a distance equal to the width of this margin. In order that this procedure may be easily accomplished, a suitable indicator such as the line 30 may be placed on the film tab, as shown in Fig. 1, to show the extent to which the film should be moved.

In the present embodiment, I provide the dark slide or shutter 23 of the adapter with a translucent portion or strip 40 of celluloid or other suitable material, having a roughened or such type of surface that it is capable of bearing arbitrary and temporary opaque or light obstructing markings thereon, to be light recorded on the sensitized element. As it is translucent while the major portion of the slide is opaque, I prefer to form it separately and preferably of the same thickness as the slide, and it may be fastened within a correspondingly shaped hole in the slide by any suitable means. As a specific form of fastening means that may be adopted, I have shown in Fig. 5 a metal blank 41, the inner portion of which is cut out to provide space for the celluloid strip. Spring fingers 42 and 43, provided on the inner and outer peripheries, are bent in alternate directions so as to clasp the strip 40, on the one hand, and the edges of an opening in the slide, on the other, after which the whole is subjected to pressure to embed the fingers in the strip and the slide so as to present a smooth surface that may pass through the lightlock without catching. A mask of opaque material 44 (Fig. 1) affixed to the slide may be utilized to cover the fingers projecting over the strip, so that the title portion of the negative may have uniform straight edges.

The translucent portion 40 is so positioned relative to the remainder of the slide, in the embodiment described, that it is opposite the upper part of the exposure opening 15 in the adapter or holder when the slide 23 has been inserted to the utmost extent, thus allowing any designating marks on the strip to be in the path of light transmitted to the upper margin of the film or plate in the rear of the slide and so be light recorded thereon. The slide is of such a length and the top and bottom cross pieces 13 and 14 of the face members 12 of the adapter or holder of such widths that the slide 23 may be raised to a sufficient extent to allow the translucent strip 40 to be withdrawn to a position behind the upper cross piece 13 out of line with the exposure opening before the lower end of the slide has been raised above the top of the lower front cross piece 14, so as to protect the sensitized element when the adapter or holder is to be removed from the camera. This is the normal position of the slide.

The operation of the device thus far described is as follows:

The normal position of the dark slide or shutter 23 is that shown in Fig. 3 in which it is partially withdrawn from the adapter. When so disposed, the translucent strip or panel 40 is masked behind the upper cross piece 13 at the margin of the exposure opening 15 and as the remaining portion of the slide is sufficiently extensive to still coöperate with the lower rail 14, the exposure opening is sealed and the films 27 are protected from all light in their dark chamber 24. To take a picture on the foremost film, the entire picture area thereof as defined by the exposure opening 15 is uncovered by withdrawing the slide 23 entirely and the usual procedure followed. To place a designating mark on the film, either before or after the picture is taken, the slide 23 is thrust all the way in, as shown in Fig. 4 and also in Fig. 1. This carries the translucent strip or panel 40 upon which the mark has been placed (the slide or shutter being withdrawable to expose the panel exteriorly for writing purposes) clear of the cross piece 13 and into register with a margin of the exposure opening 15 and of a portion of the film, the remainder of the film being still protected from light from the lens. Light is then admitted through the lens which light prints the mark or designation, appearing on the panel, on the film.

Both the slide 23 and the films 27 being shiftable relatively to the exposure opening, the films by means of the tab strips 28, it is also possible and desirable to photograph the designations upon that margin or end of the film strips which is normally unexposed through being hidden by the front face of the film pack casing 25 and in rear of the upper cross piece 13 of the adapter. To accomplish this, when the panel 40 is in operative position, the foremost film 27 after it has received its picture taking exposure, is only partially withdrawn by means of a tab 28 on its way from the exposure chamber 24 to the storage chamber 24ª so that the unexposed margin or border is brought opposite the panel 40, the remainder of the film being still protected by the shutter or slide and the mark-printing exposure is then made through the lens as before. In properly positioning this margin to receive the printing, the indication 30 on the tab strips 28 is utilized as before explained.

The plate holder shown in Figs. 7 and 8 may involve any suitable construction in its broader aspect, but is modified, as will appear later, in certain details embodying my invention. This holder is somewhat similar to the adapter and comprises in general a hollow frame 11 for containing the sensitized material, a face member 12 defining an exposure aperture 15 and a slide 23 insertible through a slot 20 between the upper cross piece 13 and the frame 11 to protect the contained sensitized material from light. Any suitable type of lightlock for the slide opening may be used, but I have illustrated in Fig. 7 the well known form comprising resilient spring fingers 31 and cloth cover 32 thereover positioned in a recess in the slot 20. If the plate holder is to be adapted for two plates, a centrally located septum 33 is provided to form two compartments for the plates 34. A plate holding block 35 having an upwardly projecting rim 36 and supported by a spring 37 serves to hold the sensitive plate in each compartment in the usual manner against the upper cross piece of the frame 11 and behind a downwardly projecting rim 38 thereon.

If desired, the translucent strip 40 may be located at or near the bottom of the slide, and may extend wholly across the bottom of the slide, as shown in Fig. 6, in which case it is concealed only when the slide has been pushed in to the limit of motion, the recess behind the cross piece 46 being of sufficient depth to allow of this movement. It should be noted that, in its broader aspects, the upper portion of the adapter or plate holder serves practically as a continuation of the top wall of the camera, and that it is immaterial whether the non-actinic portion of the slide opening is in the top of the camera or in the top of the holder, the function of the slide being to coöperate with the camera to exclude light transmitted by the camera lens from all of the normally exposed portion of the sensitized element or from all but a portion on which designations are to be recorded, while the translucent strip on the slide is to serve as a window or stencil for performing the light recording operation in coöperation with the camera and its lens.

In order that the slides may be maintained in either an operative or inoperative position for light recording the titling designations as desired, I provide a spring locking member 50 affixed by suitable means to the top of the adapter or holder and having a resilient upright portion and a projecting lug 51 intermediate its ends to coöperate with the under side of the handle 52 of the slide 23, as shown in Fig. 3 or with a groove 53 on one or both sides of the handle, as shown in Figs. 4, 7 and 8, to hold the slide in a raised or partially withdrawn position, to maintain the translucent member concealed and the sensitized element unexposed to light. While I prefer such a locking device, one might simply use a designating mark 54, as shown on Fig. 6, to determine the proper position of the slide, in which case there should be sufficient friction between the slide and the walls and slideways of the adapter or holder, so that the slide would tend to stay wherever placed in the frame. If the plate holder is a double one intended for carrying two plates, as has been described, two spring locking members are provided for the separate slides and may be used as finger holds for withdrawing the plate holder from the camera.

A simple and feasible method of light recording designating marks on the sensitized element is that of writing or otherwise applying light obstructing marks on a translucent slide or translucent marks on a light obstructing slide to form a stencil, inserting the same through a slide opening in the container into contact with the element and passing light through the marked slide to the element. As will be noted on Figs. 4 and 7, the marginal face members 39 of the film pack, in the one case, and the projecting shoulders or rims 36 and 38 of the plate holder, in the other, designed to hold the film or plate in place render it difficult to insert a slide into the adapter or holder to obtain the necessary contact without liability of injuring the surface of the sensitized element. By my method and arrangement, as herein described, the principles of projection are utilized whereby the necessity for intimate contact between these parts and elaborate changes in the structure of the camera or holder, in order to effect such contact, are avoided.

It will be understood that the terms "transparent" and "translucent" are used herein in the substantially synonymous meaning of common usage but generally restricted to the property of transmitting actinic light while "opaque" as used is descriptive of the property of intercepting actinic light, the reason being that the slide 23, if translucent, though non-actinic, might still sufficiently protect the sensitive material while the panel 40, though translucent, if non-actinic throughout, would be inoperative to record light resisting markings applied thereto.

I claim as my invention:

1. The combination with a container for photographic sensitized material having an exposure opening defining the picture area, of a shutter having a portion constituting a transparency for light printing a designating mark upon the material, said shutter being movable, selectively, to a position in which it seals the exposure opening or to a position in which the transparency is in operative relationship to the opening.

2. The combination with a container for photographic sensitized material having an exposure opening defining the picture area and means for shifting the material with reference to said opening, of a shiftable shutter normally sealing the opening and having a portion constituting a transparency for light printing a designating mark upon the material when the shutter is shifted into operative relationship with the opening.

3. The combination with a film pack having an exposure opening and tabs for shifting the films with reference thereto, of a shutter normally sealing the opening and provided with a normally inoperative portion constituting a transparency for light printing a designating mark upon a film, said shutter being withdrawable from the opening to take the picture on one portion of a film and also movable to a position in which it protects that portion of the film and the transparency is presented at a margin of the opening opposite an adjacent but unexposed margin of the film positioned opposite to it by a shifting of the film.

4. The combination with a container for photographic sensitized material having an exposure opening defining the picture area, of an opaque shutter normally sealing said opening and provided with a translucent panel adapted to receive opaque markings to be light printed upon the material, said shutter being movable to bring the panel opposite the exposure opening and a portion of the material while the remainder of the latter is protected by the opaque portion of the shutter.

5. The combination with a holder for photographic sensitive material, said holder having an exposure aperture defining the picture area, of a shutter member adapted to normally close the aperture and protect the contained sensitive material from actinic light and provided with means for light printing a designation upon the sensitive material by localized exposure at the margin of the aperture, and an element normally masking said light printing means, from which the latter is freed to assume an operative position by a change in the position of the shutter.

6. In a camera having a light aperture and a slide-opening in one wall thereof, a support for a photographically sensitized element, and a non-actinic slide, insertible into the opening and between the light aperture and the sensitized element and having a translucent portion near one margin, capable of bearing designations thereon, said slide being of such size that it may coöperate with the camera when in one position to prevent all light from the aperture affecting the element and in another position to admit light only through the translucent portion to a margin of the element for the recording of the designations thereon.

7. In combination with a camera having an opening in one wall and embodying a lens and a support for photographically sensitized material, a movable shutter between the lens and the sensitized material provided with a non-actinic portion adapted to coöperate with the camera to exclude all light from the sensitized material when in one position and with a light permeable portion capable of bearing designating marks thereon to be light recorded on the sensitized material when the shutter is in a second position and an extension on said shutter projecting through said opening for the manipulation thereof to the desired position.

8. A holder for photographically sensitized material, said holder having an exposure opening at one side and a slide-opening at one end for the insertion of a slide and a recess at the opposite end to receive the slide, in combination with an opaque slide projecting through the slide opening and having a translucent portion near one margin thereof capable of bearing arbitrary designations thereon, said opaque portion of the slide being of sufficient size and the recess of such depth that all light may be excluded from the exposure opening of the holder when the slide is in one position, or the translucent portion be between the sensitized material and the exposure opening while the opaque portion protects the remainder of the sensitized material, so that light may be admitted therethrough to affect only the part of the sensitized material adjacent said translucent portion.

9. A film pack adapter comprising a hollow frame having a chamber for a pack and an opening at the rear thereof for the introduction of the pack, a door for the opening, side top and bottom marginal face members defining an exposure open smaller than the chamber to hold the pack in place, an opaque slide to prevent the admission of light through the exposure opening having a translucent portion near one end thereof adapted to bear designating marks, said holder having a light locked slide opening and slideways in the rear of the face members, the slide being of such length and the top and bottom face members of such dimensions that the translucent portion of the slide may be maintained either concealed behind a marginal face member or opposite the exposure opening, while the whole of the exposure opening is covered by the slide.

10. The combination with a holder for photographically sensitized material, said holder having an exposure aperture and a slide-opening, of a slide having a character receiving portion and an opaque portion, said slide being insertible therein in one position to cover said aperture and in another position to permit a mark on the character receiving portion to be light printed through the aperture, and a locking mechanism for maintaining the slide in one of said positions.

11. In combination with a holder for photographically sensitized material, said holder having an exposure aperture and a slide opening, a slide insertible therein in one position to exclude light from said aperture and having a translucent portion capable of bearing designations thereon for light printing markings upon the material when the slide is in another position, and having an exterior handle provided with a groove and a resilient locking mechanism on the holder coöperating with the groove in the handle to maintain the slide in one of the said positions.

12. A method of taking a photograph on a sensitized element in a camera and applying designating marks on a normally unexposed margin thereof, comprising the steps of photographically exposing that portion of the element which is normally adapted to be exposed, moving the element to bring the unexposed marginal portion into the same field of exposure and light recording such markings thereon by another separate exposure.

13. A method of taking a photograph on a sensitized element in a camera and applying designating marks on a normally unexposed margin thereof, comprising the steps of photographically exposing that portion of the element which is normally adapted to be exposed, moving the element to bring the unexposed marginal portion into the same field of exposure, placing a light affecting designating mark between the marginal portion of the element and the camera lens, and exposing such marginal portion to light from the lens by another separate exposure to record the marks thereon.

14. A method of taking a photograph in a camera on a film pack having drawing tabs for moving the film from an exposing position to a protective position and applying designating marks on the margin of the film which is normally concealed, comprising the steps of photographically exposing that portion of the film which is normally adapted to be exposed, drawing the tab of the exposed film to bring an unexposed marginal portion of the film into the field of exposure, placing a translucent body bearing designating marks adjacent said margin, covering the remainder of the film and then exposing such margin to projected light to record the marks thereon.

ALFRED A. RUTTAN.

Witnesses:
C. E. HUTCHINGS,
J. S. ALLEN.